(12) United States Patent
Schmidt et al.

(10) Patent No.: US 10,927,920 B2
(45) Date of Patent: Feb. 23, 2021

(54) PASSIVE DAMPING SYSTEM FOR MASS FLOW CONTROLLER

(71) Applicant: Illinois Tool Works Inc., Glenview, IL (US)

(72) Inventors: Travers Schmidt, Glenview, IL (US); Jia Wang, Glenview, IL (US); Ronald Kyle Smith, Glenview, IL (US); Cedric Aragona, Glenview, IL (US)

(73) Assignee: ILLINOIS TOOL WORKS, INC, Glenview, IL (US)

( * ) Notice: Subject to any disclaimer, the term of this patent is extended or adjusted under 35 U.S.C. 154(b) by 0 days.

(21) Appl. No.: 16/151,099

(22) Filed: Oct. 3, 2018

(65) Prior Publication Data

US 2019/0101179 A1    Apr. 4, 2019

Related U.S. Application Data

(60) Provisional application No. 62/568,152, filed on Oct. 4, 2017.

(51) Int. Cl.
*F16K 31/02* (2006.01)
*F16F 13/00* (2006.01)
(Continued)

(52) U.S. Cl.
CPC .......... *F16F 13/005* (2013.01); *F16F 1/04* (2013.01); *F16F 1/18* (2013.01); *F16F 1/3605* (2013.01);
(Continued)

(58) Field of Classification Search
CPC .... F16F 13/005; F16F 1/04; F16F 1/18; F16F 1/3605; F16F 1/3737; F16F 15/04;
(Continued)

(56) References Cited

U.S. PATENT DOCUMENTS

| | | | | |
|---|---|---|---|---|
| 2,637,514 A | * | 5/1953 | O'Connor | F16F 15/04 248/582 |
| 3,330,519 A | * | 7/1967 | Thorn | F16F 1/40 267/141.1 |

(Continued)

FOREIGN PATENT DOCUMENTS

| | | |
|---|---|---|
| EP | 0565292 A1 | 10/1993 |
| JP | H0517281 U | 3/1993 |
| WO | 2014158375 A1 | 10/2014 |

OTHER PUBLICATIONS

International Search Report & Written Opinion issued for corresponding International Application No. PCT/US2018/054419 dated Feb. 13, 2019. (27 pages).

*Primary Examiner* — Minh Q Le
(74) *Attorney, Agent, or Firm* — McGuireWoods LLP (57) ABSTRACT

A mass flow controller includes an inlet, a flow path in which fluid passes, a mass flow sensor configured to provide a signal corresponding to mass flow of the fluid through the flow path; a control valve configured to regulate a flow of the fluid out of an outlet of the mass flow controller; and a passive damping system coupled to the control valve and configured to dissipate fluid flow induced vibrations introduced by the control valve assembly. The passive damping system includes a damping pad between a receiver section of a valve base and a diaphragm backer. The passive damping system can also include a damping washer. The passive damping system can include one or more plunger balls between the damping pad and the valve base or one or more wave springs.

20 Claims, 4 Drawing Sheets

(51) Int. Cl.
*G05D 7/06* (2006.01)
*F16F 1/04* (2006.01)
*F16F 1/18* (2006.01)
*F16F 1/373* (2006.01)
*F16F 1/36* (2006.01)
*F16K 31/06* (2006.01)
*F16K 47/00* (2006.01)
*F16F 15/04* (2006.01)

(52) U.S. Cl.
CPC ........ *F16F 1/3737* (2013.01); *F16K 31/0696* (2013.01); *F16K 47/00* (2013.01); *G05D 7/0617* (2013.01); *G05D 7/0635* (2013.01); *F16F 15/04* (2013.01); *F16F 2228/04* (2013.01); *F16F 2230/0011* (2013.01); *F16F 2230/08* (2013.01); *F16F 2232/08* (2013.01); *F16F 2238/022* (2013.01); *F16F 2238/026* (2013.01)

(58) Field of Classification Search
CPC ........... F16F 2228/04; F16F 2230/0011; F16F 2230/08; F16F 2232/08; F16F 2238/022; F16F 2238/026; F16K 31/0696; F16K 47/00; G05D 7/0617; G05D 7/0635
USPC ........................................ 137/487.5
See application file for complete search history.

(56) References Cited

U.S. PATENT DOCUMENTS

| | | | |
|---|---|---|---|
| 5,131,619 A * | 7/1992 | Daugherty | F16F 1/3605 248/635 |
| 5,232,196 A * | 8/1993 | Hutchings | F16K 31/0655 251/129.08 |
| 8,814,135 B2 | 8/2014 | Ams et al. | |
| 9,371,930 B2 | 6/2016 | Hayashi | |
| 10,054,243 B1 * | 8/2018 | Kelly | G05D 7/0126 |
| 2002/0097935 A1 * | 7/2002 | Beckers | A61C 1/05 384/490 |
| 2005/0173664 A1 | 8/2005 | Ogawa | |
| 2006/0237064 A1 | 10/2006 | Benson | |
| 2007/0227512 A1 * | 10/2007 | Steinman | F02M 25/0836 123/519 |
| 2010/0072413 A1 | 3/2010 | Koyomogi | |
| 2011/0168279 A1 | 7/2011 | Nishimura | |
| 2015/0276449 A1 * | 10/2015 | Ito | G01F 1/78 73/861.351 |
| 2016/0001239 A1 * | 1/2016 | Dille | G05D 7/0635 73/861.353 |
| 2016/0040743 A1 * | 2/2016 | Staton | A42B 3/0453 2/412 |
| 2016/0146283 A1 * | 5/2016 | Sato | F16F 15/04 267/141.1 |
| 2016/0289463 A1 * | 10/2016 | Gutsch | C08J 7/047 |
| 2018/0051764 A1 * | 2/2018 | Wake | C08K 3/22 |

* cited by examiner

PASSIVE DAMPING SYSTEM FOR MASS FLOW CONTROLLER

CROSS REFERENCE TO RELATED APPLICATION

This application claims priority to U.S. Provisional Patent Application No. 62/568,152, filed Oct. 4, 2017, entitled "Passive Damping System for Mass Flow Controller," the entire contents of which are hereby fully incorporated herein by reference for all purposes.

TECHNICAL FIELD OF THE DISCLOSURE

The present disclosure relates, in general, to non-linear artifacts generated during operation of a mass flow controller and, in particular, to a passive damping system for efficiently and effectively dampening non-linear artifacts generated during operation of a mass flow controller.

BACKGROUND

The presently disclosed subject matter relates generally to mass flow controller systems and operations, and more particularly to passive damping of vibrations experienced by the mass flow controller.

Many industrial processes require precise control of various process fluids. For example, in the semiconductor industries, mass flow meters (MFMs) are used to precisely measure an amount of a process fluid that is introduced to a process chamber. In addition to measuring the mass flow, mass flow controllers (MFCs) are used to precisely measure and control the amount of process fluid that is introduced to a process chamber. It is to be understood that the term fluid, as used herein, applies to any type of gas, liquid or vapor to which controlled flow can be of interest.

Flow rates in a single MFC can vary from a few cubic centimeters per minute to hundreds of liters per minute, pressure conditions can range from sub-atmospheric to over 100 PSIA, and gases can range from a Helium to a relatively heavy Sulfur Hexafluoride. Such widely contrasting conditions can create flow dynamics in a valve cavity of the MFC that induces vibrations over a wide frequency domain (e.g., 400 Hz to 1,000 Hz). At one or more of these frequencies, the MFC can experience universal resonant vibration as fluid flows through a control valve of the MFC. This vibration, initiated by fluid flow dynamics, is transferred to the entire MFC once a flow excitation approaches a natural frequency of the MFC system. Such a vibration applied to the MFC can limit accuracy of the controlled flow rate of the MFC.

SUMMARY

The present disclosure describes a passive damping system configured to interface with parts of a mass flow controller to dampen non-linear artifacts introduced during operation of the controller's valve.

In one aspect, the present disclosure is directed to a mass flow controller comprising: an inlet configured to receive fluid, a flow path in which the fluid passes through the mass flow controller, a mass flow sensor configured to provide a signal corresponding to mass flow of the fluid through the flow path, a control valve configured to regulate a flow of the fluid out of an outlet of the mass flow controller, and a passive damping system configured to dissipate fluid flow induced vibrations introduced in the control valve.

In some embodiments, the mass flow controller further comprises a valve base having a receiving section. In these embodiments, the passive damping system further comprises a damping pad between the receiver section of the valve base and a diaphragm backer of the control valve. In certain embodiments, the passive damping system further comprises a damping washer. In certain embodiments, the passive damping system further comprises one or more plunger balls between the damping pad and the valve base. In certain embodiments, the plunger balls are spring-loaded. In certain embodiments, the plunger balls are made of stainless steel or other materials. In certain embodiments, the passive damping system further comprises a wave spring between the damping pad and the valve base.

In another aspect, the present disclosure is directed to a mass flow controller comprising: an inlet configured to receive fluid; a flow path in which the fluid passes through the mass flow controller; a mass flow sensor configured to provide a signal corresponding to mass flow of the fluid through the flow path; a control valve configured to regulate a flow of the fluid out of an outlet of the mass flow controller; and a damping pad between a receiver section of a fixed body and the control valve. In some embodiments, the damping pad is between a receiver section of the fixed body and a backer plate of the control valve. Additionally, a washer between the damping pad and the fixed body. In certain embodiments, a spring device between the washer and the fixed body. In certain embodiments, the damping pad extends from the control valve to approximately the fixed body.

In a further aspect, the present disclosure is directed to a mass flow controller comprising: an inlet configured to receive fluid; a flow path in which the fluid passes through the mass flow controller; a mass flow sensor configured to provide a signal corresponding to mass flow of the fluid through the flow path; a control valve assembly configured to regulate a flow of the fluid out of an outlet of the mass flow controller; and a spring device between a receiver section of a valve base and the control valve. In certain embodiments, the spring device is between the receiver section of the valve base and a diaphragm backer. In certain embodiments, the spring device comprises one or more plunger balls. In certain embodiments, the spring device comprises one or more wave springs. In certain embodiments, a washer between the spring device and a diaphragm backer. In certain embodiments, a damping pad between the spring device and a diaphragm backer.

Additional embodiments, advantages, and novel features are set forth in the detailed description.

BRIEF DESCRIPTION OF THE DRAWINGS

Illustrative embodiments of the presently disclosed subject matter are described in detail below with reference to the attached drawing figures, which are incorporated by reference herein and wherein.

DETAILED DESCRIPTION

The disclosed embodiments include a system for improving accuracy of a mass flow controller by reducing fluid flow dynamics induced vibrations at a control valve of the mass flow controller. The disclosed embodiments and advantages thereof are best understood by referring to FIGS. 1-4 of the drawings. The disclosed embodiments may not be limited to any particular type of mass flow sensing technology. They may include thermal based using thermal sensor, pressure based using pressure sensors and flow restrictors for computing flow and Coriolis type sensing methods. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments can be implemented.

Figure 1:
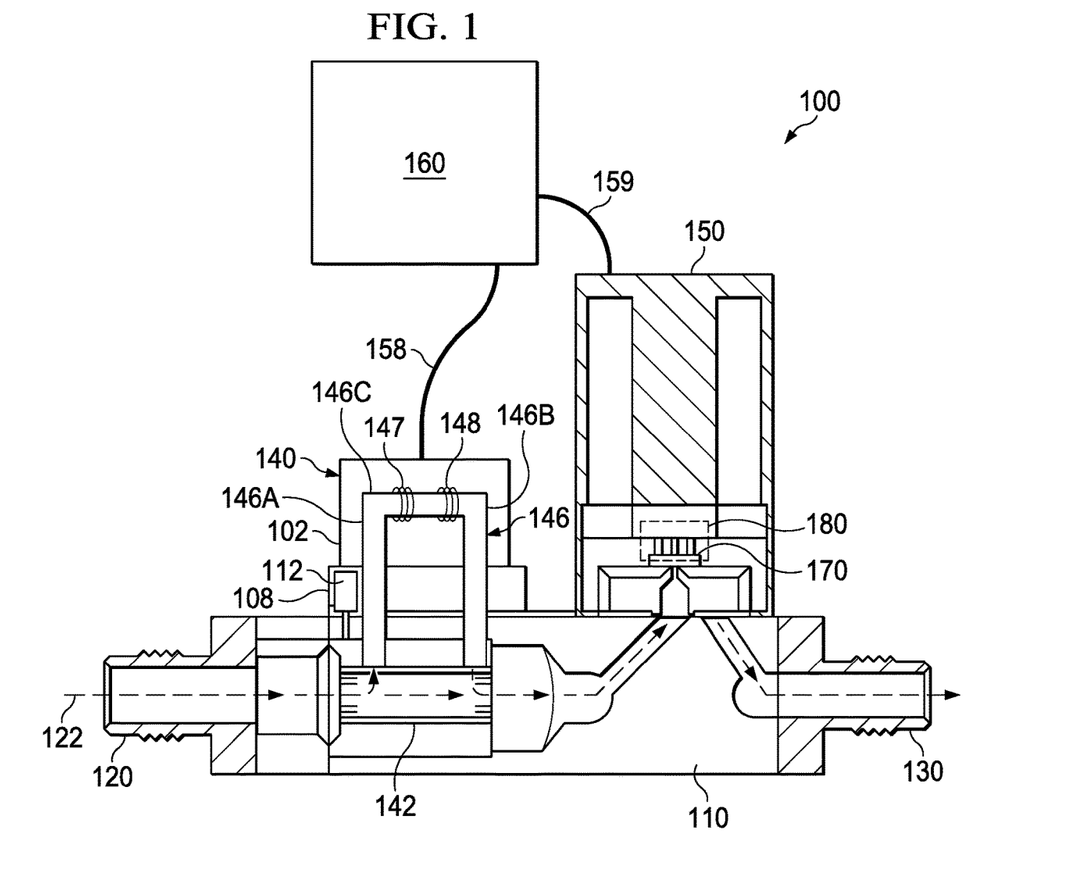
FIG. 1 illustrates a mass flow controller with a passive damping system in accordance with a disclosed embodiment.

FIG. 1 illustrates an example of a thermal mass flow controller (MFC) 100 in accordance with a disclosed embodiment but may include other type of mass flow sensing methods. The mass flow controller 100 includes a block 110, which is the platform on which the components of the MFC 100 are mounted. A thermal mass flow meter 140 and a valve assembly 150 containing a control valve 170 are mounted on the block 110 between a fluid inlet 120 and a fluid outlet 130. The thermal mass flow meter 140 includes a bypass 142 through which typically a majority of fluid flows and a thermal flow sensor 146 through which a smaller portion of the fluid flows. The bypass 142 is tuned with the known fluid to determine an appropriate relationship between fluid flowing in the mass flow sensor and the fluid flowing in the bypass 142 at various known flow rates, so that the total flow through the flow meter can be determined from a thermal flow sensor output signal. The thermal flow sensor 146 and bypass 142 can then be mated to the control valve 170 and control electronics 160 and then tuned again, under known conditions. The responses of the control electronics 160 and the control valve 170 are then characterized so that the overall response of the system to a change in set point or input pressure is known, and the response can be used to control the system to provide the desired response.

The thermal flow sensor 146 is contained within a sensor housing 102 (portion shown removed to show the thermal flow sensor 146) mounted on a mounting plate 108. The thermal flow sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146C to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal can be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter can be determined are described, for example, in commonly owned U.S. Pat. No. 6,845,659, which is hereby incorporated by reference. The electrical signals derived from the resistive windings 147, 148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller. For example, the mass flow sensor can be tuned by running known amounts of a known fluid through the sensor portion and adjusting certain signal processing parameters to provide a response that accurately represents fluid flow. For example, the output can be normalized, so that a specified voltage range, such as 0 V to 5 V of the sensor output, corresponds to a flow rate range from zero to the top of the range for the sensor. The output can also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 can include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a flow measurement.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller 100.

In the illustrated example, the flow rate is supplied by electrical conductors 158 to a closed loop system controller 160 as a voltage signal. The signal is amplified, processed and supplied using electrical conductors 159 to the control valve assembly 150 to modify the flow. To this end, the controller 160 compares the signal from the mass flow sensor 140 to predetermined values and adjusts the proportional valve 170 accordingly to achieve the desired flow.

Figure 2:
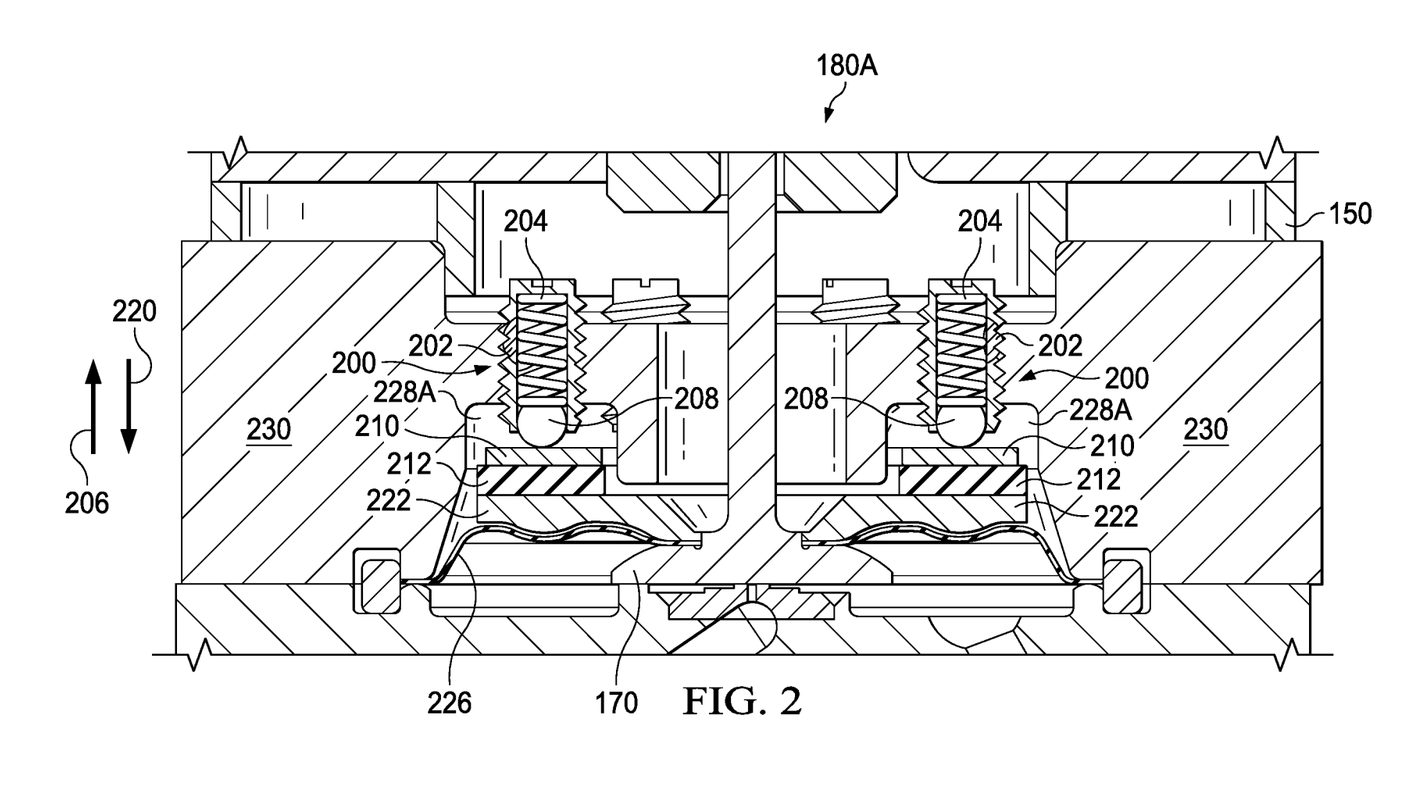
FIG. 2 illustrates a plunger ball embodiment of the passive damping system of FIG. 1 in accordance with a disclosed embodiment.
Figure 3:
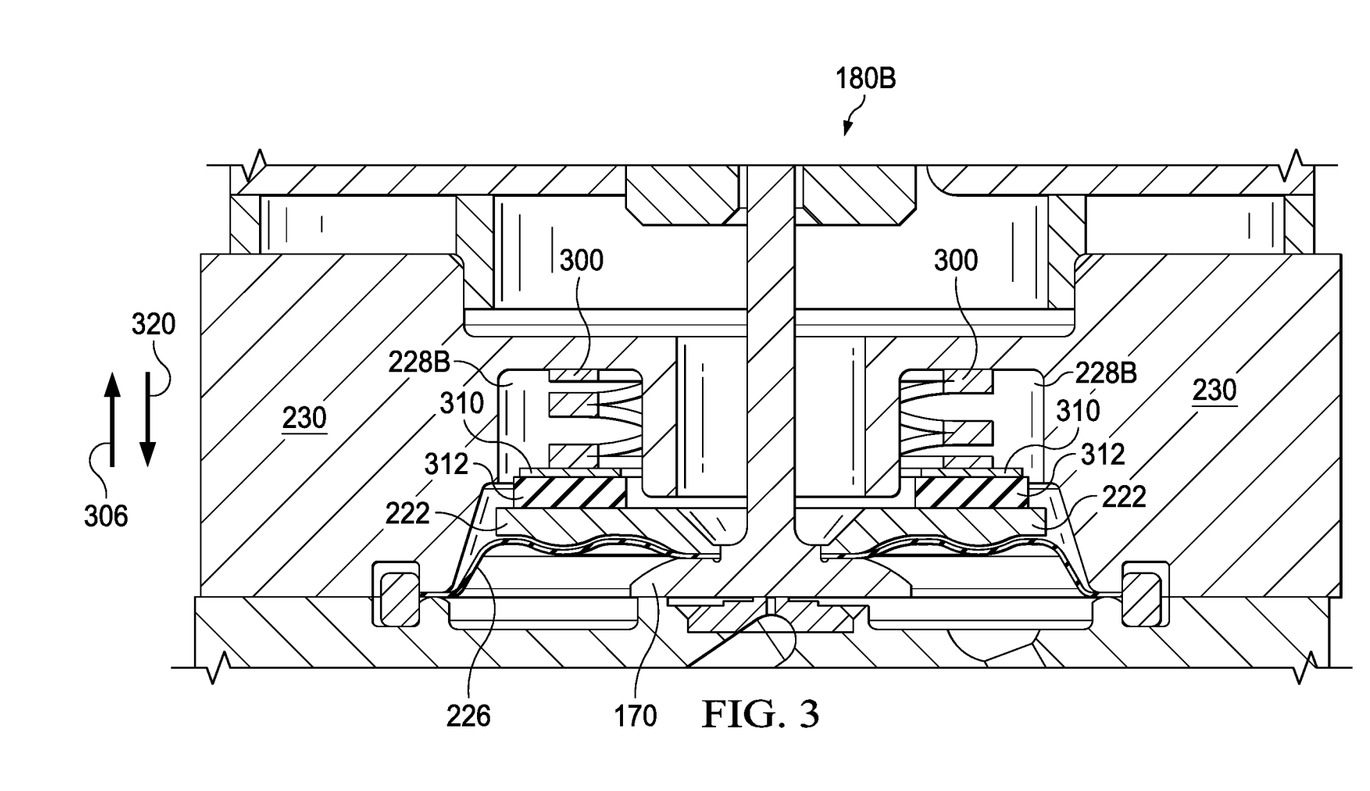
FIG. 3 illustrates a spring-loaded embodiment of the passive damping system of FIG. 1 in accordance with a disclosed embodiment.
Figure 4:
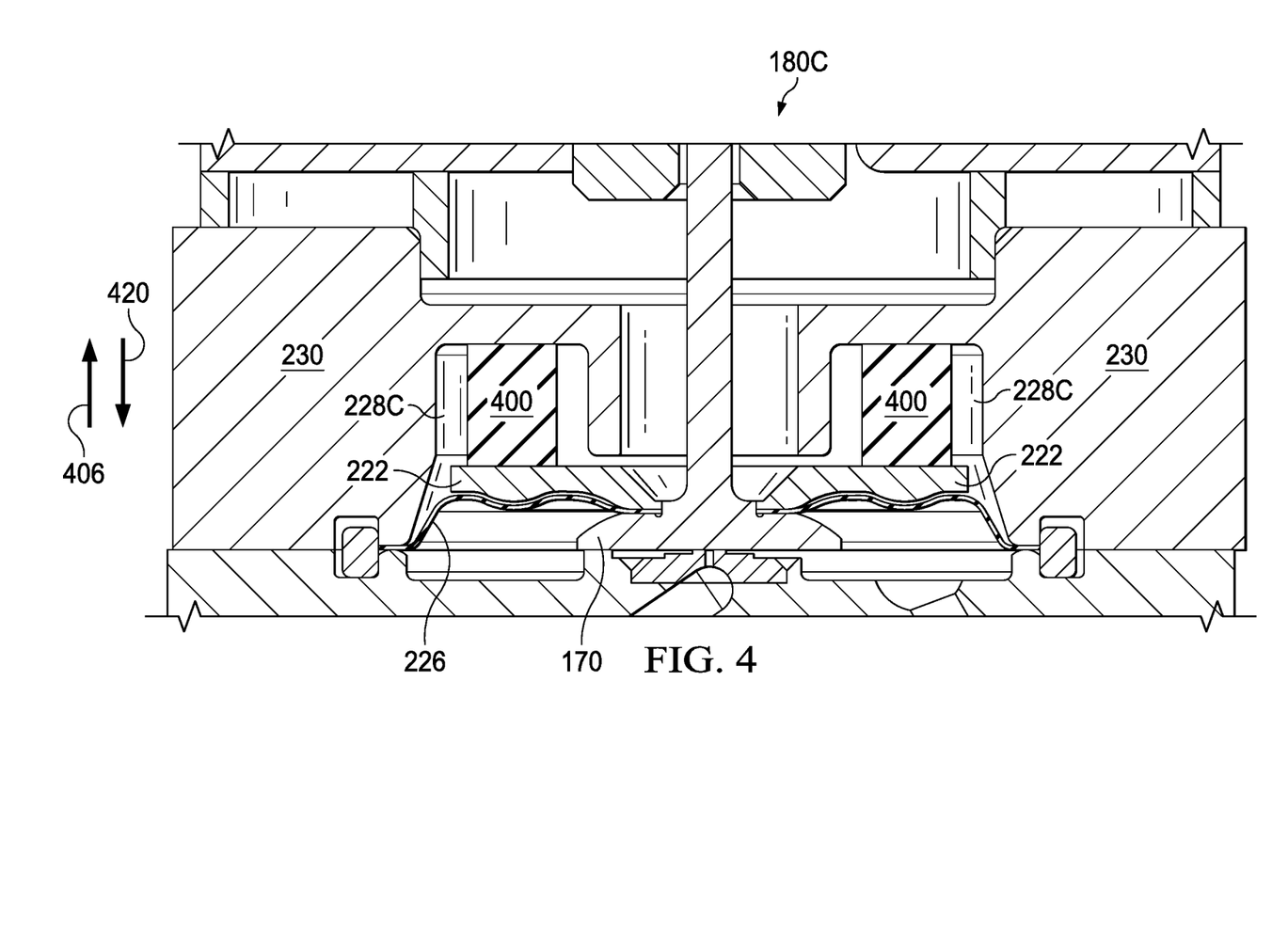
FIG. 4 illustrates a soft washer embodiment of the passive damping system of FIG. 1 in accordance with an embodiment.

The control valve 170 can be a Piezo or other technology valve configured to operate at flow rates greater than or equal to two standard liters per minute. To avoid inaccuracies caused by fluid flow dynamics induced vibrations at the control valve 170 of the mass flow controller 100, a passive damping system 180 can be implemented at the control valve 170. The passive damping system 180, embodiments of which are discussed in detail below with respect to FIGS. 2-4, provides a mechanism to reduce or eliminate the transfer of flow induced vibration caused by operation of the control valve 170 to a remainder of the mass flow controller 100. The passive damping system 180 dissipates vibration energy prior to transfer of the vibration energy to a remainder of the mass flow controller 100. Multiple configurations of the passive damping system 180 are contemplated. For example, the passive damping system 180 can include the positioning of one or more spring-loaded plunger balls about the control valve 170, the positioning of a spring about the control valve 170, and/or the positioning of a soft high damping washer about the control valve 170 to dissipate vibrations generated by the fluid flow through the mass flow controller 100. As used herein, the term passive means that a system is entirely mechanical without electrical controls.

FIG. 2 illustrates a plunger ball embodiment 180A of the passive damping system 180 in accordance with a disclosed embodiment. The plunger ball embodiment 180A includes one or more spring-loaded plungers 200. The spring-loaded plungers 200 include a plunger housing 202. A spring 204 is positioned within the plunger housing 202 to provide a force in a direction 220 on a plunger ball 208. The plunger ball 208 abuts a washer 210, which is positioned adjacent to a damping pad 212. When vibration occurs in the control valve assembly 150, a spring force provided by the spring 204 on the plunger ball 208 transfers to the washer 210 and the damping pad 212. The spring force is sufficient to hold the position of the damping pad 212 such that vibration energy occurring in the control valve assembly 150 is dissipated by deformation of the damping pad 212. When the control valve 170 is opened (e.g., when the control valve 170 moves in a direction 206), the spring force generated by the spring-loaded plungers 200 is offset by an actuator lifting force of the control valve 170 with minimal impact on a lifting stroke of an actuator of the control valve 170.

Generally, the spring-loaded plungers 200 can be installed between any vibration source and a fixed mounting component of the mass flow controller 100. For example, the spring-loaded plungers 200 can be positioned between a diaphragm backer 222 and a valve base 230 of the mass flow controller 100. Diaphragm 226 is below the diaphragm backer 222 and above the control valve 170. The fluid flow can cause the diaphragm 226 and the stem of the control valve 170 to vibrate which can then cause the diaphragm backer 222 to vibrate. In this particular embodiment, the plunger ball embodiment 180A is installed in a receiving section 228A of a valve base 230. The receiving section 228A can be a milled out section of the valve base 230. In this particular embodiment, the damping pad 212 interfaces with the diaphragm backer 222 and the spring-loaded plungers 200 are fixed to the valve base 230. In either case, the washer 210 can be positioned between the damping pad 212 and the spring-loaded plungers 200. When the vibrational energy is dissipated from the diaphragm backer 222 into the passive damping system 180, the total vibration of the control valve 170 is significantly reduced to avoid exciting a resonant mode of the entire mass flow controller 100.

The spring-loaded plungers 200 and the washer 210 can be made from stainless steel or other materials. The damping pad 212 can be made from a polyurethane rubber or other compliant material. The plunger ball embodiment 180A includes one or more of the spring-loaded plungers 200. In an embodiment, the plunger ball embodiment 180A includes from three to six or more spring-loaded plungers 200.

FIG. 3 illustrates a spring-loaded embodiment 180B of the passive damping system 180 in accordance with a disclosed embodiment. The spring-loaded embodiment 180B includes one or more springs 300. The springs 300 can be wave springs. A wave spring, as used herein, is a spring made from a flat wire with waves added to the spring to provide the springs with a springing effect. The wave spring can also be made from other wire shapes (e.g., cylindrical, rectangular prism, etc.). In other embodiments, the springs 300 can be coil springs with a damping coating. The damping coating can function as a damper to dissipate vibration energy from the control valve 170. The spring 300 provides a force in a direction 320 on a washer 310. The washer 310 is positioned adjacent to a damping pad 312. When vibration occurs at the control valve 170, a spring force provided by the spring 300 provides a force to the washer 310 and the damping pad 312. The spring force is sufficient to hold the position of the damping pad 312 so that vibration energy is dissipated by deformation of the damping pad 312. When the control valve 170 is opened (e.g., when the control valve 170 moves in a direction 306), the spring force generated by the spring 300 is offset by an actuator lifting force of the control valve 170 with minimal impact on a lifting stroke of the actuator of the control valve 170.

Generally, the spring 300 can be installed between any vibration source and a fixed mounting component of the mass flow controller 100. For example, the spring 300 can be positioned between the diaphragm backer 222 and the valve base 230 of the mass flow controller 100. In this particular embodiment, the spring loaded embodiment 180B is installed in a receiving section 228B of a valve base 230. The receiving section 228B can be a milled out section of the valve base 230. When the control valve 170 is opened (e.g., by moving in the direction 306), the spring 300 can abut valve base 230 to provide the stationary frame for the spring 300. When vibrational energy is dissipated from the diaphragm backer 222 into the passive damping system 180B, the total vibration of the control valve 170 is significantly reduced to avoid exciting a resonant mode of the entire mass flow controller 100.

The spring 300 and the washer 310 can be made from stainless steel or other similar materials. The damping pad 312 can be made from a polyurethane rubber or other compliant material. The spring-loaded embodiment 180B includes one or more of the springs 300. In the illustrated embodiment, the spring-loaded embodiment 180B includes a single spring 300 positioned around the control valve 170.

FIG. 4 illustrates a soft washer embodiment 180C of the passive damping system 180 in accordance with an embodiment. The soft washer embodiment 180C includes a soft washer 400. The soft washer 400 can be made from a polyurethane rubber or other similar compliant material. The soft washer 400 can provide a force on the control valve 170 in a direction 420 when the control valve 170 is opened by moving in a direction 406. When vibration occurs at the control valve 170, the force provided by the soft washer 400 provides a support backer to the diaphragm backer 222 of the control valve 170. The soft washer 400 dissipates the vibration energy occurring in the valve assembly 150 by deformation of the soft washer 400. When the control valve 170 is opened (e.g., when the control valve 170 moves in the direction 406), the force generated by the soft washer 400 in the direction 420 is offset by an actuator lifting force of the control valve 170 with minimal impact on a lifting stroke of the actuator of the control valve 170.

Generally, the soft washer 400 can be installed between any vibration source and a fixed mounting component of the mass flow controller 100. For example, the soft washer 400 can be positioned between the diaphragm backer 222 and the valve base 230 of the mass flow controller 100. In this particular embodiment, soft washer 400 is installed in a receiving section 228C of the valve base 230. When the control valve 170 is opened (e.g., by moving in the direction 406), the soft washer 400 can abut the valve base 228, which provides the stationary frame for the soft washer 400. When the vibrational energy is dissipated from the diaphragm backer 222 into the passive damping system 180, the total vibration of the control valve 170 is significantly reduced to avoid exciting a resonant mode of the entire mass flow controller 100.

The soft washer 400 can be made from a polyurethane rubber or other compliant material. The soft washer embodiment 180C includes one or more of the soft washers 400. In the illustrated embodiment, the soft washer embodiment 180B includes a single soft washer 400 positioned around the control valve 170. The durometer of the damping washer is based on the effectiveness of the material in dampening vibrations from the surrounding environment and this can be specific to a particular mass flow controller application. The receiving section 228C can be of various width and depth depending on specific application requirements. It should be understood that the damping systems described herein, embodiments 180A-180C, can be positioned between any fixed or rigid body and an oscillating or vibrating source within a mass flow controller.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structure.

What is claimed is:

1. A mass flow controller comprising:
   an inlet to receive fluid;
   a flow path in which the fluid passes through the mass flow controller;
   a mass flow sensor to provide a signal corresponding to mass flow of the fluid through the flow path;
   a control valve to regulate a flow of the fluid out of an outlet of the mass flow controller; and
   a passive damping system to dissipate fluid flow induced vibrations introduced by the control valve, wherein the passive damping system includes a damping pad positioned between and against a structure of a receiving section of a valve base and a diaphragm backer;
   the diaphragm backer positioned between a diaphragm and the damping pad.

2. The mass flow controller of claim 1 wherein the passive damping system further comprises a damping washer.

3. The mass flow controller of claim 1 wherein the passive damping system further comprises one or more plunger balls between the damping pad and the valve base.

4. The mass flow controller of claim 3 wherein the one or more plunger balls are coupled to the valve base.

5. The mass flow controller of claim 4 wherein the plunger balls are made of stainless steel or other metals or alloys.

6. The mass flow controller of claim 3 wherein the plunger balls are spring-loaded.

7. The mass flow controller of claim 1 wherein the passive damping system further comprises a wave spring between the damping pad and the valve base.

8. The mass flow controller of claim 1 wherein the mass flow sensor comprises of a thermal-sensor used in thermal based mass flow controllers used to determine temperature.

9. The mass flow controller of claim 1 wherein the mass flow sensor comprises at least one pressure sensor and at least one flow restrictor used to determine pressure of the fluid.

10. The mass flow controller of claim 1 wherein the mass flow sensor comprises at least one Coriolis tube used to determine flow rate of fluid.

11. A mass flow controller comprising:
    an inlet to receive fluid;
    a flow path in which the fluid passes through the mass flow controller;
    a mass flow sensor to provide a signal corresponding to mass flow of the fluid through the flow path;
    a control valve to regulate a flow of the fluid out of an outlet of the mass flow controller; and
    a damping pad positioned between and against a structure of a receiving section of a valve base and a diaphragm backer;
    the diaphragm backer positioned between a diaphragm and the damping pad.

12. The mass flow controller of claim 11 further comprising a washer between the damping pad and the fixed body.

13. The mass flow controller of claim 12 further comprising a spring device between the washer and the fixed body.

14. The mass flow controller of claim 11 wherein the damping pad extends from the control valve to approximately the fixed body.

15. A mass flow controller comprising:
an inlet configured to receive fluid;
a flow path in which the fluid passes through the mass flow controller;
a mass flow sensor to provide a signal corresponding to mass flow of the fluid through the flow path;
a control valve to regulate a flow of the fluid out of an outlet of the mass flow controller; and
a spring device between a receiver section of a valve base and the control valve, the spring device positioned between and against a structure of the receiver section of the valve base and a diaphragm backer; the diaphragm backer positioned between a diaphragm and the spring device.

16. The mass flow controller of claim 15 wherein the spring device comprises one or more plunger balls.

17. The mass flow controller of claim 15 wherein the spring device comprises one or more wave springs.

18. The mass flow controller of claim 15 further comprising a washer between the spring device and a diaphragm backer.

19. The mass flow controller of claim 15 further comprising a damping pad between the spring device and a diaphragm backer.

20. The mass flow controller of claim 15 wherein the mass flow sensor comprises of a thermal-sensor used in thermal based mass flow controllers used to determine temperature.

* * * * *